Aug. 23, 1966 J. A. BURNS ETAL 3,268,652

ELECTRICAL CIRCUIT ASSEMBLIES

Filed Nov. 12, 1963 6 Sheets-Sheet 1

INVENTORS
J. A. BURNS
G. W. EPTANG
By C. J. Martin, Jr.
ATTORNEY

United States Patent Office 3,268,652
Patented August 23, 1966

3,268,652
ELECTRICAL CIRCUIT ASSEMBLIES

John A. Burns, New Hope, Pa., and George W. Eftang, New Monmouth, N.J.; said Burns assignor to Western Electric Company, Incorporated, New York, N.Y., a corporation of New York, and said Eftang assignor to Bell Telephone Laboratories, Incorporated, New York, N.Y., a corporation of New York Filed Nov. 12, 1963, Ser. No. 322,607
18 Claims. (Cl. 174—68.5)

This invention relates to electrical circuit assemblies. More particularly, this invention relates to electrical circuit assemblies including electrical connectors extending through apertures provided in circuit boards for electrically connecting circuit elements provided on opposite surfaces of the circuit boards.

In the manufacture of electrical circuit assemblies, circuit boards having electrically conductive circuit elements mounted thereon in spaced, electrically insulated relationship have been utilizd to electrically connect components mounted on the circuit boards. To maximize the surface area of the circuit boards which may be used for supporting the circuit elements, the circuit elements have been provided on opposite surfaces of the circuit boards, and various types of electrical connectors have been used to connect the circuit elements on the opposite surfaces. When electrical connectors of the through-connector type have been used, the circuit boards have been provided with apertures extending therethrough, between and intersecting the opposite surfaces adjacent to the circuit elements. One of the through connectors, in the form of a rigid electrical conductor, extended through each aperture. The opposite ends of the rigid electrical conductor and the circuit elements are secured in electrical contact by solder joints.

Use of the through connectors has been accompanied by certain problems. One problem resulted from dimensional changes of the circuit board in response to changing environmental conditions such as humidity or temperature, for example. A dimensional change in the thickness, for example, causes the opposite surfaces to stress the rigid electrical conductors and the solder joints. Since the electrical conductors are rigid, the stresses created by the dimensional changes of the circuit board are applied almost exclusively to the solder joints. The yield strength of solder is not sufficient, in most cases, to absorb these stresses without cracking or breaking the joint, causing an unstable circuit condition to occur.

One type of rigid electrical conductor which is subject to such problems is the eyelet which is provided with a first flange and is inserted in the circuit board aperture so that the first flange contacts the circuit elements on one surface of the circuit board. A second flange is then formed on the eyelet and is urged into contact with the circuit elements on the opposite surface of the circuit board. A rigid solder joint is then formed between each of the first and second flanges of the eyelet and the circuit elements.

Manual soldering techniques have been used in the past to form the solder joints. Even though such techniques are usually performed in succession on individual eyelets to apply a minimum of heat to both the previously soldered eyelets and to portions of the circuit board adjacent to an eyelet that is being soldered, significant dimensional changes of the circuit board are produced, and, hence, the unstable circuit conditions attendant significant dimensional changes are not avoided.

In addition, such manual techniques are inherently slow, tedious and costly, and, in many manufacturing processes, have been replaced by semiautomatic inserting and soldering facilities. One such facility provides the eyelet and the circuit elements adjacent to the aperture, with a solder coating prior to insertion of the eyelet into the aperture. Subsequent to insertion, the inserting and soldering facility fuses the solder coating by passing an electric current through the eyelet to form what is known as a resistance-fused eyelet. It has been found that when resistance-fused eyelets having a selected coefficient of expansion, for example, are used in conjunction with circuit boards having a different coefficient of expansion, the unstable circuit conditions may arise during manufacturing operations performed subsequent to the resistance-fusing operation.

For example, electrical components are often mounted on the circuit boards after the resistance-fusion operation by inserting lead wires thereof through apertures provided in the circuit boards. The lead wires are soldered to the circuit elements on the circuit board in a wave-soldering operation, for example, which is rapid and less expensive than manual soldering techniques. During the wave-soldering operation, the circuit board and the eyelets are severely heated. The difference between the coefficient of expansion of the circuit board and the rigid eyelet causes the severe stresses to be applied on the solder joints, which often fail and cause an unstable circuit condition between the circuit element and the eyelets.

Electrical systems, such as communication equipment, often require as many as several hundred thousand through connectors and may be subjected to adverse environmental conditions characterized by changes in humidity or temperature, for example. When used in such large numbers and/or under such severe environmental conditions, through connectors, such as eyelets which are subject to the unstable circuit conditions, are of limited reliability and may cause costly system failures.

For purposes of description, the reliability of a component or of many components may be defined in terms of the "FIT," which is one failure per $10^9$ component hours of operation. The $10^9$ component hours may include many components operating for a few hours or a few components operating for many hours. In such a communication equipment, negligible "FIT" rates (1/100 to 1/1000 "FIT") are required even under adverse environmental conditions.

The limited reliability of the eyelet type of through connectors has been revealed by reliability tests which subject a circuit assembly including through connectors in their assembled relationship with a circuit board, to varying environmental conditions at least as severe as those encountered during the normal use of the circuit assembly. Reference will hereafter be made to environmental conditions of temperature and to coefficients of thermal expansion to facilitate the description. It is to be understood, however, that other environmental conditions, such as humidity, which cause dimensional changes in the circuit boards according to coefficients of expansion thereof dependent upon the moisture content of the circuit boards, are also sources of the unstable circuit conditions previously discussed.

In one of such tests, the circuit assembly is subjected to an environment in which the temperature thereof is cyclically varied. The difference between the coefficient of thermal expansion of the circuit board and the rigid eyelets causes severe stresses to be applied, for example, to the solder joints formed between the flanges and the circuit elements. Such thermal cycling tests cause the solder joints in many cases to crack and open the electrical connection between the circuit elements.

Efforts have been made to modify the design of such eyelet through connectors to lessen the stress applied to the rigid solder joints. However, such efforts have not significantly increased the reliability of the eyelet through connectors because the source of the stress—namely the difference between the environmental coefficients of expansion and contraction of the circuit board and the rigid eyelets—has not been eliminated as a factor which is detrimental to the rigid solder joints. In general, such efforts have been directed toward modifying the design of the flanges of the eyelets while maintaining the rigid, intermediate portion of the eyelet rigid. Such modification has not significantly increased reliability, however, because the rigid, intermediate portion of the eyelet resists forces exerted thereon by the flanges and causes failure of the solder joints and of the flanges.

Other types of through connectors, which have been used in the past, include coiled wires which are inserted into apertures provided in the circuit boards. Component terminal leads are inserted into a passageway formed by the coiled wire. The circuit board is then subjected to a soldering operation in which solder travels by capillary action along the coiled wires, through the aperture, and forms a continuous connection between circuit elements provided on opposite surfaces of the circuit board. However, the coiled wire through connectors which are covered with solder have been found to be subject to the open-circuit problems mentioned above with respect to the eyelet through connectors because the solder covering renders the coiled wire rigid and extremely resistive to expansion and contraction.

Research resulting in the present invention and conducted in an endeavor to eliminate the above-described open-circuit problems and to provide highly reliable through connectors, indicates that the provision of a compliant or flexible electrical conductor through the aperture of a circuit board, in conjunction with the provision of facilities for sealing the aperture against passage therein of a bonding material having a fluid state, result in an improved through connector which is highly reliable and which offers many advantages from an ease of manufacture standpoint. More particularly, the improved through connector eliminates the source of stress on the solder joints because the intermediate portion of the electrical conductor, being flexible and not being contacted with the bonding material during its fluid state, is extensible and contractible upon dimensional changes of the circuit board, and, hence, does not apply significant stress on bonded joints between the ends of the flexible conductor and the circuit elements.

It is an object of the present invention to provide new and improved electrical circuit assemblies which are not detrimentally affected by variable environmental conditions.

A related object of the present invention resides in the provision of electrical circuit assemblies including electrical connectors extending through apertures provided in circuit boards to electrically connect circuit elements provided on opposite surfaces of the circuit boards.

Another object of the present invention is to provide an electrical circuit assembly utilizing an electrical connector for forming an electrical connection that does not deteriorate upon subjecting the circuit assembly to variable environmental conditions.

Still another object of the present invention resides in a circuit assembly including a resilient core having a flexible, extensible conductor formed thereon wherein the resilient core is mounted in a lined or unlined aperture extending between circuit elements which are provided on opposite surfaces of a circuit board and are electrically connected by the flexible conductor.

Yet another object of the present invention resides in a circuit assembly provided with a resilient core for sealing an aperture provided in a circuit board so that a flexible conductor, extending through the aperture in a bent path, is free to flex upon variations of the environment to which the circuit board is subjected.

A further object of the present invention is to provide in an aperture of a circuit board having circuit elements adjacent to opposite ends of the aperture, a flexible conductor extending in a curved path and a resilient core having end portions extending out of the aperture for urging opposite ends of the flexible conductor into engagement with the circuit elements.

A still further object of the present invention resides in the provision of an electrical circuit assembly wherein a resilient core having a flexible conductor wound spirally thereon is provided in an aperture extending between circuit elements provided on opposite surfaces of a circuit board for sealing the aperture against entry of a fluid bonding material to permit a portion of the flexible conductor received in the aperture to flex upon subjection of the circuit assembly to variable environmental conditions.

An additional object of the present invention is to provide an electrical conductor that is braided around the periphery of a resilient core received in an aperture of a circuit board for establishing a compliant circuit path between circuit elements provided on opposite surfaces of the circuit board.

An added object of the present invention resides in the provision of a resilient core having a flexible conductor formed in a curved path thereon and received in a hollow, easily deformable sleeve wherein the sleeve extends through an aperture provided in a circuit board and the flexible conductor electrically connects circuit elements provided on opposite surfaces of the circuit board.

With these and other objects in view, the present invention contemplates an electrical circuit assembly wherein a support, such as a circuit board having a pair of spaced surfaces and having an aperture extending between and intersecting the pair of spaced surfaces, is provided with circuit elements positioned adjacent to each end of the aperture. A flexible, electrically conductive element extends through the aperture for providing a flexible, electrically conductive path between the circuit elements. A resilient core is provided in the aperture for urging terminal portions of the flexible, electrically conductive element into engagement with the circuit elements and for urging an intermediate portion of the flexible, electrically conductive element into engagement with the wall of the aperture to retain the element in the aperture. The terminal portions of the electrically conductive element may be bonded by a fusible bonding material to the circuit elements to provide rigid joints which render the flexible, electrically conductive path permanently connected between the circuit elements. During bonding with the bonding material, the resilient core cooperates with the electrically conductive element in the aperture and with the wall of the aperture to seal the aperture against passage therein of the bonding material in its fluid state. With the aperture sealed, the flexible, electrically conductive path may flex such as by bending or unbending in the direction of the axis of the aperture upon variation of the environmental conditions to which the support is subjected and upon the resultant expansion and contraction of the support in the direction of the axis of the aperture. Because the intermediate portion of the electrically conductive element within the aperture is not coated with the bonding material and is thus maintained flexible, no significant stress is applied by the electrically conductive element on the rigid joints. Hence, the rigid joints are not opened and the electrical circuit assembly is not detrimentally affected by the variable environmental conditions.

A complete understanding of this invention may be had by reference to the following detailed description when read in conjunction with the accompanying drawings illustrating various embodiments thereof, wherein.

Figures 1, 2, 3:
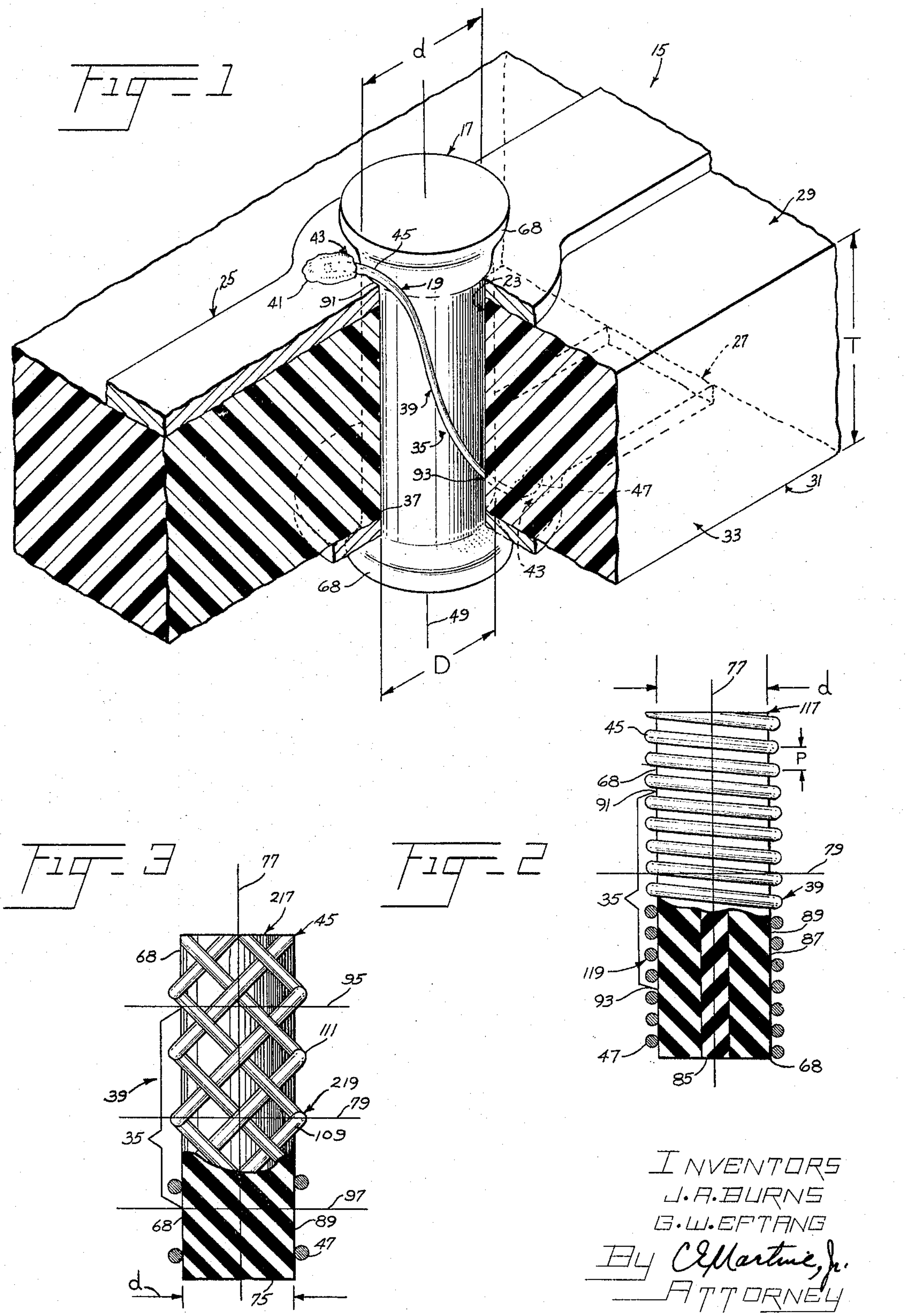
FIG. 1 is a perspective view of an electrical circuit assembly of the present invention showing a circuit board partially broken away to expose a resilient core received in an aperture provided in the circuit board and a flexible electrical conductor extending through the aperture between circuit elements provided on spaced surfaces of the circuit board.
FIG. 2 is a partially sectioned view of an alternate embodiment of a resilient core and an alternate embodiment of an electrical conductor, where the configuration of the flexible electrical conductor is a bend in the form of a helix.
FIG. 3 is a partially sectioned view showing another embodiment of the resilient core and another embodiment of the flexible electrical conductor, wherein the configuration of the flexible electrical conductor is a curved portion formed by braided strands.
Figure 4:
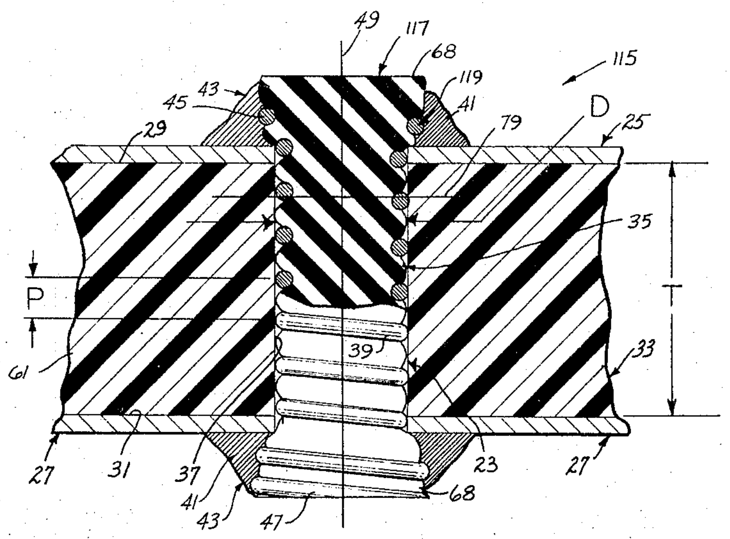
FIG. 4 is a vertical section of an electrical circuit assembly forming another embodiment of the invention and subjected to a first environmental condition wherein the circuit board has a first thickness.
Figure 6A:
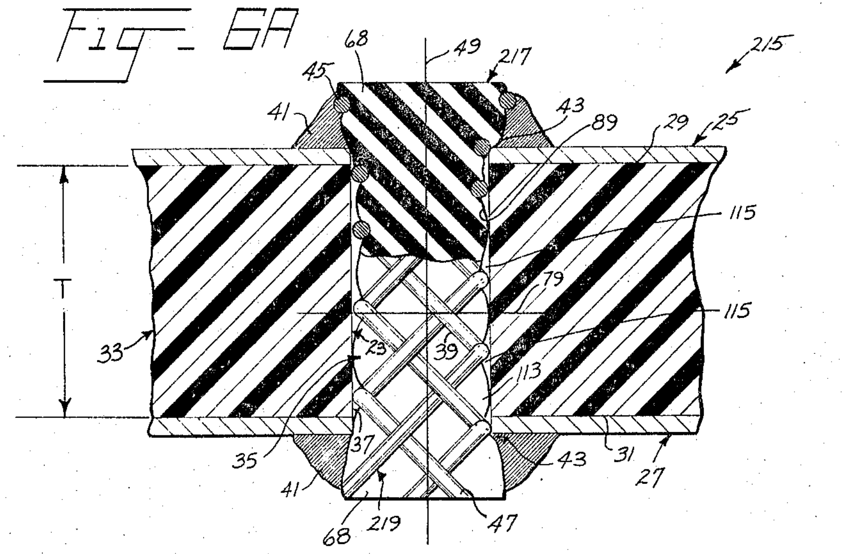
Figure 6B:
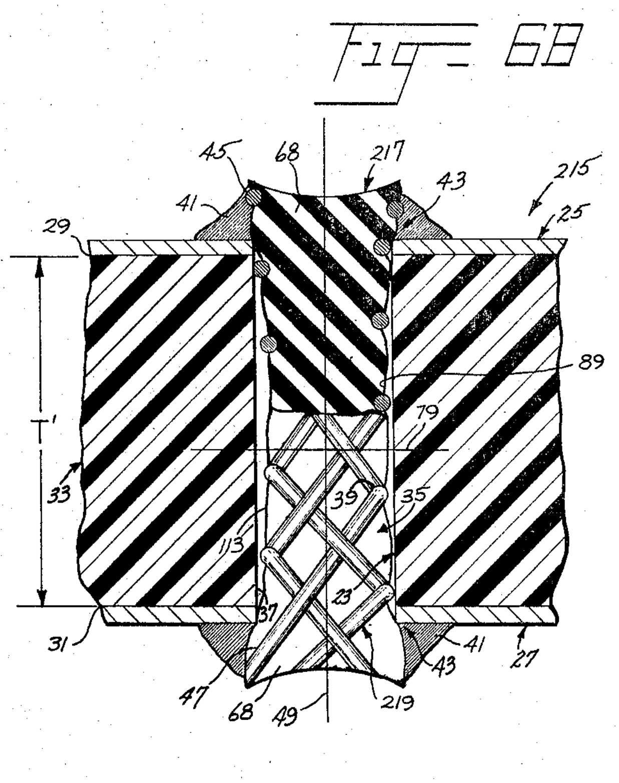
Figure 7:
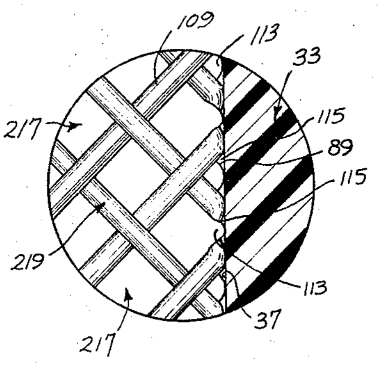
Figure 8:
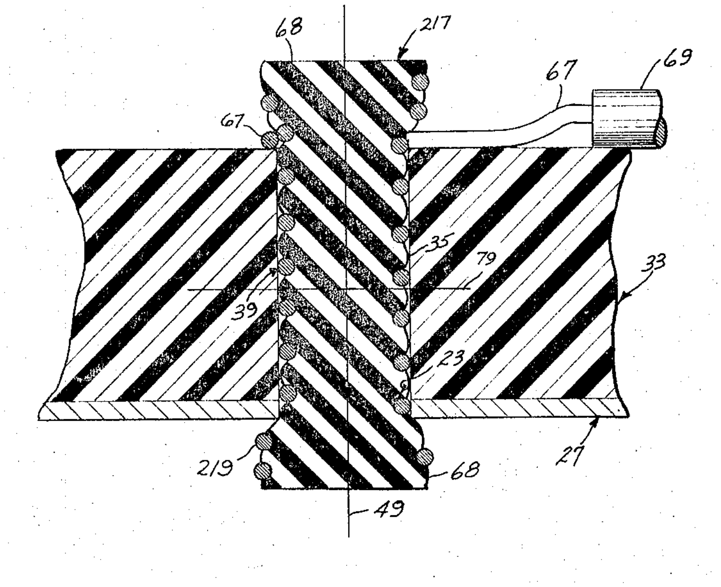
Figure 9:
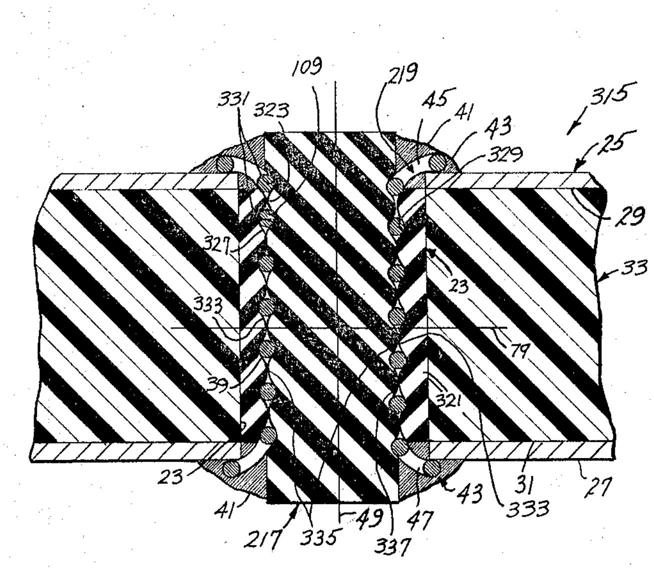
Figure 10:
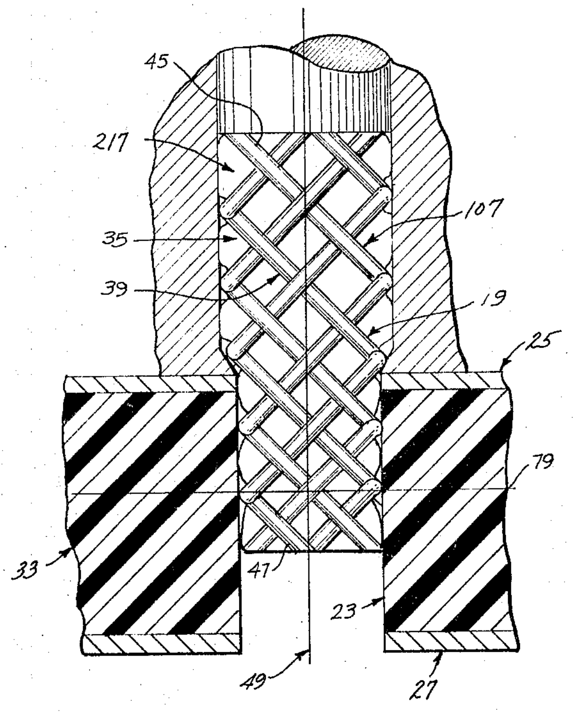
Figure 11:
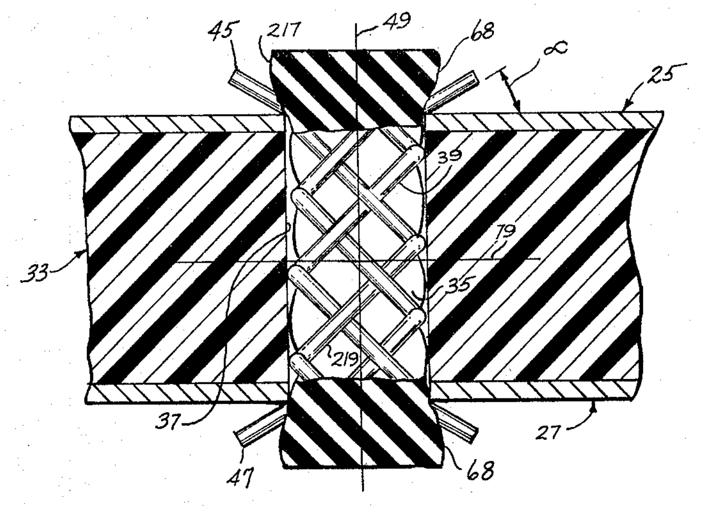
Figure 12:
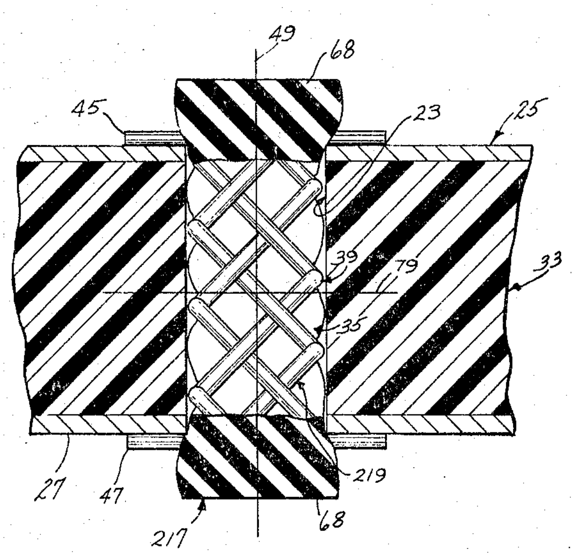
Figure 13:
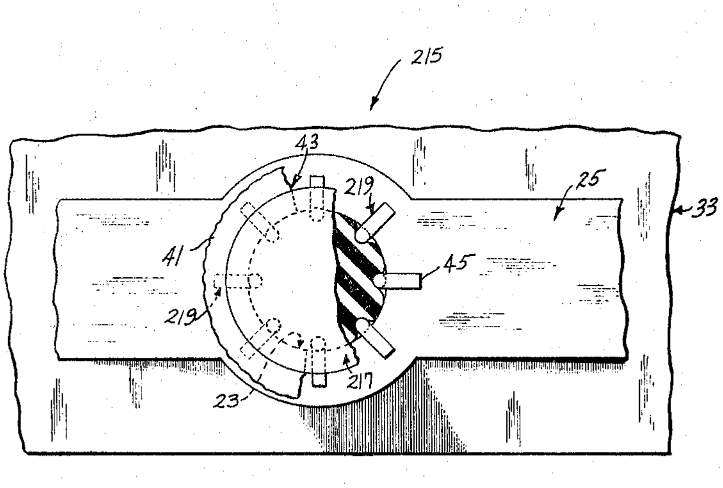

FIG. 6*a* is a vertical section of another circuit assembly incorporating the features shown in FIG. 3 and illustrating the cooperation of the resilient core, a wall of the aperture, and braided strands forming the electrical conductor, wherein such cooperation precludes contact between a bonding material and an intermediate portion of the braided strands;

FIG. 6*b* is an enlarged view of a portion of FIG. 6*a* showing in detail the cooperation of the resilient core, the wall of the aperture, and the braided strands forming the electrical conductor;

FIG. 7 is a sectional view showing the circuit board illustrated in FIG. 6*a* expanded so that the circuit elements cause the intermediate portion to extend;

FIG. 8 is a vertical section similar to FIG. 4 illustrating a terminal lead of an electrical component forming one of the circuit elements and the resilient core urging the end portions of the flexible electrical conductor into engagement with the circuit element and the terminal lead;

FIG. 9 is a sectional view showing an alternative embodiment of a circuit assembly including a hollow sleeve, a resilient core received in the hollow sleeve, and a flexible electrical conductor interposed between the sleeve and the resilient core;

FIG. 10 is a sectional view showing a resilient core having a flexible electrical conductor thereon being inserted into the aperture of a circuit board;

FIG. 11 is a sectional view similar to FIG. 10 showing the end portions of the electrical conductor flared toward the circuit elements;

FIG. 12 is a sectional view similar to FIG. 11 showing the flared end portions flattened against the circuit elements prior to forming rigid joints between the flattened, end portions and the circuit elements; and FIG. 13 is a plan view of the flared end portions shown in FIG. 12, with solder in place to form a rigid joint between one of the end portions and one of the circuit elements.

Referring first to FIG. 1 of the drawings, an electrical circuit assembly 15 is shown including a resilient member 17, such as a core having a flexible electrical conductor 19 such as a metal strand, wire, or metal ribbon, formed thereon in a curved or bent path. The resilient member 17 and the flexible electrical conductor 19 are received in an aperture 23 extending between circuit elements 25 and 27 provided on spaced surfaces 29 and 31, respectively, of a support 33, such as a panel or a circuit board. An intermediate section 35 of the resilient member 17 is compressed by a wall 37 of the aperture 23 and urges an intermediate portion 39 of the electrical conductor 19 against the wall 37 to hold the flexible electrical conductor 19 in the aperture 23. The intermediate portion 39 of the flexible electrical conductor 19 and the intermediate section 35 of the core cooperate with the wall 37 of the aperture to seal the aperture 23 against passage therein of a bonding material 41 while in a fluid state or condition during formation of rigid, electrically conductive joints 43—43 between the circuit elements 25 and 27 and terminal or end portions 45 and 47, respectively, of the flexible electrical conductor 19, which extend out of opposite ends of the aperture 23. It may be appreciated that by preventing the bonding material 41 from entering the aperture 23 and solidifying around the intermediate portion 39 of the flexible electrical conductor 19, the intermediate portion 39 is maintained in condition for flexure upon expansion and contraction of the circuit board 33 in response to variations of the environmental conditions of the electrical circuit assembly 15.

Considering the flexible electrical conductor 19 in detail, the flexible electrical conductor includes the terminal portions 45 and 47 which are in spaced relationship at opposite ends of the intermediate portion 39. The terminal portions 45 and 47 may be considered as members which are capable of being moved relative to each other in the general direction of a longitudinal axis 49 of the aperture 23 and which upon such relative movement exert forces on the intermediate portion 39. At least the intermediate portion 39 of the electrical conductor 19 has the mechanical property of being compliant or flexible. The terms "compliant" and "flexible," as used herein, indicate that the intermediate portion 39, in response to such forces exerted thereon by the terminal sections 45 and 47, is capable of being easily flexed or bent.

In FIG. 1, the intermediate portion 39, having the mechanical property of being compliant or flexible, is shown extending through the aperture 23 in an initial configuration when the circuit board 33 is subjected to a normal environmental condition. The initial configuration of the intermediate portion may be a bend or a curvature so that the intermediate portion may be described as being bent or curved to form a curved path.

With the intermediate portion 39 flexible and initially in the bent or curved configuration, forces exerted on the ends thereof by movement of the terminal portions 45 and 47 apart, easily extend the intermediate portion 39 thereof by causing the intermediate portion to become less curved and tend to straighten. On the other hand, forces exerted on the ends of the intermediate portion 39 by movement of the terminal portions 45 and 47 together, easily contract the intermediate portion as by causing the intermediate portion to become more curved or more bent.

It is to be understood, then, that the increase or decrease in the component of the length of the intermediate portion along a straight line extending between the two joints 43—43 is easily accomplished by bending or unbending the strand or strands comprising the electrical conductor 19, so that the terminal portions 45 and 47 may easily move apart or together. Such bending or unbending is to be distinguished from strain, such as increases or decreases in the length of a straight, rigid, metal rod (not shown), for example, resulting from tensile or compressive stresses applied to the rigid metal rod by a standard tensile testing machine (not shown). It will be apparent that the extension and contraction of the intermediate portion 39, referred to above, cause some stress in the intermediate portion. However, the stress is insignificant because the intermediate portion 39 offers little resistance to the forces exerted thereon by the terminal portions 45 and 47 and, hence, easily bends or unbends, as described above.

It will be recalled that the terminal portions 45 and 47 are secured by the rigid joints 43—43 to the circuit elements 25 and 27, respectively. Thus, with such mechanical characteristics of the flexible electrical conductor 19, and with the intermediate portion 39 curved, upon expansion, for example, of the circuit board 33, the circuit elements 25 and 27 move apart, moving the rigid joints 43—43 and the terminal portions 45 and 47 apart. The terminal portions 45 and 47 exert the forces and cause the flexible, curved, intermediate portion 39 to flex, as by becoming less curved, the length thereof being effectively extended in the direction of the longitudinal axis 49 of the aperture 23 between the terminal portions 45 and 47. Because the intermediate portion 39 is easily flexible, it does not significantly resist movement of the terminal portions 45 and 47 apart, hence, an insignificant amount of stress is applied by the terminal portions on the rigid joints 43—43. With such insignificant amount of stress applied on the rigid joints 43—43, the rigid joints are less likely to open, rendering the circuit assembly 15 capable of having a very low "FIT" rate even under severe temperature cycling conditions; hence, a more reliable electrical circuit is provided.

Referring in detail to FIG. 4, there is shown an alternative circuit assembly 115 wherein the circuit board 33 may include a sheet 61 of electrically insulative material, such as synthetic resins, epoxy-glass laminates, paper-base phenolic laminates and the like, having a normal thickness T of one-eighth inch, for example. The sheet 61 may alternatively be formed from electrically conductive material having an insulative coating thereon.

The circuit board 33 is provided with the spaced surfaces 29 and 31 which are shown as being parallel. The aperture 23 extends along the longitudinal axis 49 completely through the circuit board 33 between and intersecting the spaced surfaces 29 and 31. In conventional circuit boards, the wall 37 of the aperture 23 is generally cylindrical and is provided with a given diameter D in a direction perpendicular to the axis 49 of the aperture 23. However, the wall 37 may have various configurations so long as the aperture 23 extends through the circuit board 33.

In a conventional manner, the electrical circuit elements 25 and 27 may be provided as metal foils or as thin films of conductive material having apertures extending therethrough on the spaced surfaces 29 and 31, respectively. The circuit element 25 on the surface 29 may be utilized, for example, to connect an electrical component (not shown) to the circuit element 27 on the surface 31. Alternatively, one or both of the circuit elements 25 or 27 may be a lead or terminal 67 (see FIG. 8) extending from an end of an electrical component 69.

The environmental conditions encountered by the circuit assembly 15 during the normal use thereof may be characterized by frequent and severe changes in temperature, for example, which result in thermal cycling of the circuit board 33. In response to such thermal cycling, the circuit board 33 expands and contracts in the direction of the longitudinal axis 49, which results in changes in the thickness T of the circuit board 33. The spacing between the spaced surfaces 29 and 31 is thereby varied so that the circuit elements 25 and 27, respectively, thereon are moved relative to each other in the general direction of the longitudinal axis 49 as shown in FIGS. 4 and 5 and FIGS. 6*a* and 7. It may be understood that at a given ambient temperature, the circuit elements 25 and 27 are normally spaced by a predetermined distance (the thickness T of the circuit board 33, shown in FIGS. 1, 4 and 6*a*). Further, the circuit elements 25 and 27 are spaced by a second distance T′ (FIGS. 5 and 7), different from the predetermined distance, upon thermal expansion of the circuit board 33 in response to a higher ambient temperature. The difference in the distances T and T′ may be, for example, as great as 10 percent of the thickness of the circuit board 33.

Referring now to FIGS. 2 and 3, there are shown two embodiments 117 and 217, respectively, of resilient cores similar to the resilient core 17 (FIG. 1). The embodiments 117 and 217 are suitable for use in electrical circuit assemblies of the present invention. The resilient cores 117 and 217 are shown in FIGS. 2 and 3 as having longitudinal axes 77—77 and transverse axes 79—79. The resilient core 217 may be fabricated from a solid piece of resilient material, such as a silicone rubber, or another similar elasomer that remains resilient at temperatures, such as 550° F., at which conventional solders, such as 60–40 tin-lead solder, are maintained during soldering operations. The term "resilient" is used to define material which is capable of being readily and easily deformed by a force, and which will resume an original configuration when the force is removed. Thus, such material is capable of being readily deformed by a compressive force exerted parallel to the transverse axis 79, for example, into a deformed condition, and upon removal of the force, is capable of resuming the normal, original condition shown in FIG. 3.

With the flexible electrical conductor 19 (FIG. 1) in the form of a single curved strand, the intermediate section 35 of the resilient core 17, in the normal condition thereof, is provided with a dimension (*d*) in a direction perpendicular to the axis 49 that slightly exceeds the diameter D (FIG. 1) of the aperture 23. With such dimension, the intermediate section 35 is adapted to cooperate with the intermediate portion 39 and the wall 37 of the aperture 23, to seal the aperture against passage of the bonding material 41 therein.

Alternatively, with flexible electrical conductors 119 and 219 formed as shown in FIGS. 2 and 3, the dimension (*d*) in the normal condition of the resilient cores 117 and 217 may be slightly less than the diameter (D) (FIGS. 1 and 4) of the aperture 23. This is possible because the flexible electrical conductors 119 and 219, when inserted with the resilient cores 117 and 217, respectively, into the aperture 23, compress portions of the resilient cores 117 and 217 inwardly and force other portions thereof outwardly into or almost into contact with the wall 37 of the aperture 23 so that the aperture is sealed. More particularly, when the diameter D of the armature 23 is, for example, 0.052 inch, and the flexible electrical conductor 219 is in the form shown in FIG. 3 and is formed from a 5-mil diameter metal (e.g., gold-plated copper) strands, the aperture 23 may be effectively sealed when the resilient core 217 is a cylindrical, silicone-rubber rod having a diameter of 0.042 inch.

Figure 5:
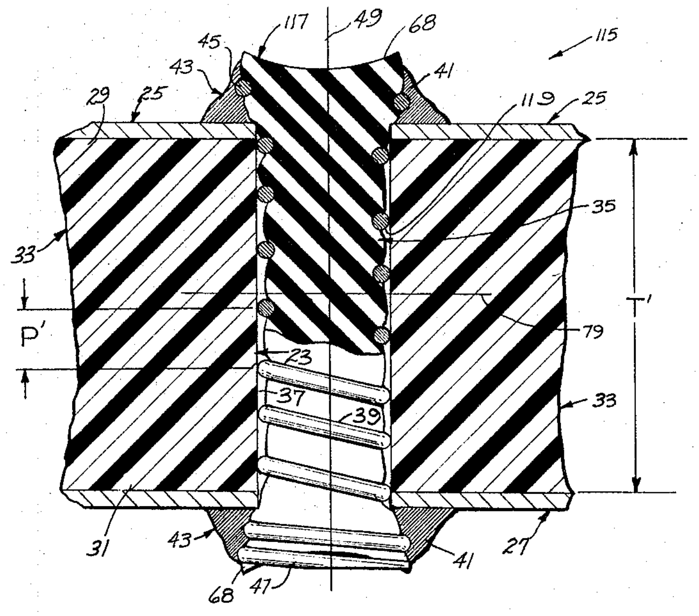
FIG. 5 is a sectional view similar to FIG. 4 showing the electrical circuit assembly of FIG. 4 subjected to a second environmental condition wherein the circuit board has a second thickness.

The length of the resilient cores 17, 117 and 217 in the direction of the longitudinal axes 49—49 preferably exceeds the thickness T′ of the circuit board 33 when the circuit board is in the expanded condition as shown in FIGS. 5 and 7. With such diametrical and length dimensions, and with the flexible electrical conductor 19, 119 or 219 thereon, the resilient core 17, 117 or 217, respectively, may be deformed into a deformed condition, inserted into the aperture 23 so that the intermediate section 35 is surrounded by the wall 37 of the aperture so that the intermediate section 35 urges the conductor 19, 119 or 219 into contact with the wall 37 of the aperture 23 and the end sections 68—68 of the resilient core 17, 117 or 217 extend out of the aperture 23. The resiliency of each of the cores 17, 117 and 217 is sufficient both to retain the resilient cores and the flexible electrical conductors 19, 119 and 219 in the apertures 23—23 and to provide an effective seal which prevents entry of the bonding material 41 in a fluid condition thereof into the apertures 23—23.

Referring to FIG. 2, the embodiment of the resilient core 117 is shown including a cylindrical rod 85 of material that is relatively stiff as compared to the softer, more resilient property of a tube 87 of resilient material, such as silicone rubber or another suitable elastomer, in which the rod 85 is received. The provision of the stiff rod 85 within the resilient tube 87 aids insertion of the resilient core 117 into the aperture 23 without lessening the sealing effect of the resilient core 117.

As shown in FIGS. 1 through 3, the resilient cores 17, 117 and 217 are provided with the flexible electrical conductors 19, 119 and 219 which may be metal ribbon, metal wire, or a strand formed from electrically conductive material. At least the intermediate portions 39—39 of the flexible electrical conductors 19, 119 and 219 are formed in curved paths on or extending at least partially around at least the intermediate sections 35—35 of the resilient cores 17, 117 and 217. The intermediate, curved portions 39—39 of the flexible electrical conductors 19, 119 and 219 may be defined as those curved portions of the electrical conductors 19, 119 and 219 between a first point 91 and a second point 93 (as shown in FIGS. 1 and 2) or between the intersection of first and second lines 95 and 97 and the electrical conductor 219 (as shown in FIG. 3, respectively).

Referring to FIG. 1, the length between the first and second points 91 and 93 of the curved, intermediate portion 39, when the intermediate portion has been flexed into a straight configuration, should at least equal the linear distance between the joints 43—43 when the circuit board 33 is in a condition of maximum anticipated expansion. Thus, when the circuit board 33 expands from a normal condition to a condition of maximum anticipated expansion similar to those illustrated in FIGS. 5 and 7, the rigid joints 43—43 and the terminal portions 45 and 47 move apart, and cause the curved, intermediate portion 39 of the electrical conductor 19 to assume a straighter configuration. Thus, the intermediate portion 39 is merely flexed, and is not elongated even if, in the extreme, the portion 39 were to just assume a straight line configuration. Accordingly, no significant stress would be applied by the intermediate portion 39 on the respective terminal portions 45 and 47 or on the rigid joints 43—43.

In practice, the maximum anticipated expansion of the circuit board 33 does not need to be precisely calculated. Rather, as shown in FIG. 2, the curved, intermediate portion 39 (between points 91 and 93) of the electrical conductor 119 is provided in the form of a turn or a plurality of turns of at least one electrically conductive strand, such as metal ribbon or metal wire, formed or wound spirally onto the outer periphery 89 of the resilient core 117. Thus, when the spiral turns of the conductor 119 have an initial pitch P measured along the axis 77, relative movement (such as movement apart) of the terminal portions 45 and 47, causes the increase in the initial pitch of the spiral turns of the conductor 119 and flexes the intermediate portion 39 of the electrical conductor 119 so that an insignificant amount of stress is applied by the intermediate portion 39 on the terminal portions 45 and 47 of the conductor 119 and on the rigid joints 43—43.

For increased reliability, the conductive curved path formed by the conductor 119 may be redundant by forming or winding more than one electrically conductive strand around the resilient core 117 to form a plurality of the curved paths between the circuit elements 25 and 27. The redundancy minimizes the effect of variables upon the ultimate reliability of the through connections.

Preferably, as shown in FIG. 3, at least the curved, intermediate portion 39 of the electrical conductor 219 is braided. The braided conductor 219 may be formed of a plurality of flexible, closely woven strands 109—109 of electrically conductive material braided over and under in opposite running helices in the form of a tube 111 on the outer periphery 89 of the resilient core 217. The strands 109—109 are braided with sufficient tension to slightly compress the resilient core 217 so that the braided conductor 219 is retained on the resilient core. The strands 109—109 of electrically conductive material may be 36-gauge copper wire, for example, having gold plating thereon for greater adherence of the bonding material 41. Because a coating on the conductors is desirable to improve the solderability, gold plating is preferable to a tin composition because the gold plated surfaces will not fuse to each other as would occur with tinned conductors when heated to the temperature of the fused solder during a bonding operation. Thus, the strands 109—109 of the intermediate portion 39 do not become fused to each other during the bonding operation.

The minimum number of strands 109—109 forming the braided conductor 219 may be selected in view of the total desired electrical current carrying capacity of the electrical connection between the circuit elements 25 and 27 and the electrical current-carrying capacity of the individual strands 109—109.

As a consequence of the braided construction of the braided conductor 219, at least the intermediate portion 39 (between lines 95 and 97 of FIG. 3) of the braided conductor readily flexes, such as by extending and contracting in the direction of the longitudinal axis 77, in response to tension and compression forces exerted thereon by the terminal portions 45 and 47, for example, along the longitudinal axis 77. Also, the braided conductor 219 is readily flexible in the direction of the transverse axis 79 and is thus capable of assuming the configuration required when the resilient core 217 is inserted in the deformed condition thereof into the aperture 23.

Attention is now directed to FIGS. 6*a*, 6*b* and 7 wherein an electrical circuit assembly 215 of the present invention is shown under two different environmental conditions, which conditions cause the circuit board 33 to assume two different thicknesses T and T'. The resilient core 217 is provided with the braided conductor 219 formed over the entire length thereof. The intermediate section 35 of the resilient core 217 and the intermediate portion 39 of the braided conductor 219 are received in the aperture 23 so that the intermediate section 35 is compressed in the direction of the transverse axis 79 of the core 217 into the deformed condition thereof.

The deformed, intermediate section 35 urges the outer periphery 89 of the intermediate portion 39 into engagement with the wall 37 of the aperture 23 to maintain the resilient core 217 and the braided conductor 219 in the aperture 23. Further, as shown in detail in FIG. 6*b*, the resilience of the resilient core 217 permits those portions 113—113 of the outer periphery 89 of the resilient core 217 between the strands 109—109 of the braided conductor 219, to protrude outwardly between the strands 109—109 of the braided conductor. Ideally, the protruding portions 113—113 of the resilient core 217 protrude into contact with the wall 37 of the aperture 23.

In actual practice, very minute spaces or passageways 115—115 may remain between the protruding portions 113—113 of the outer periphery 89 of the resilient core 217, the wall 37 of the aperture 23 and the strands 109—109. It may be appreciated that in both the ideal situation and in actual practice, the aperture 23 is effectively sealed against entry therein of the bonding material 41 in the same manner that the resilient core 217 without the braided electrical conductor 219 would seal the aperture upon insertion into the aperture. Thus, in actual practice, tests indicate the minute passageways 115—115 which remain between the protruding portions 113—113 of the resilient core 217, the wall of the aperture 37 and the strands 109—109 are too small to permit entry of the bonding material 41 in a fluid condition thereof, into the aperture 23. More particularly, when the bonding material 41 is solder, the tests indicate that passage of molten solder is precluded by the sealing effect of the resilient core 217 and the braided conductor 219 cooperating with the wall 37 of the aperture 23 despite the formation of the minute passageways 115—115. Hence, the passageways 115—115 do not permit passage of molten solder into contact with the intermediate portion 39 of the braided conductor 219.

Additionally, as shown in FIG. 6*a*, the end sections 68—68 of the resilient core 217 bulge slightly transversely outwardly and assume a greater diameter than the diameter of the aperture 23. The bulging end sections 68—68 urge the terminal portions 45 and 47 of the braided conductor 219 into engagement with the respective circuit elements 25 and 27. As shown in particular in FIG. 8, the resilience and dimensioning of the resilient core 217 in the direction of the transverse axis 79 of the aperture 23, render the end sections 68—68 effective to secure and maintain the terminal portions 45 and 47 of the braided conductor 219 against the respective circuit elements 25 and 27 for such purposes as temporarily interconnecting the circuit elements.

To achieve a permanent circuit assembly 215, the terminal portions 45 and 47 of the braided conductor 219 are (FIGS. 6*a*, 6*b* and 7, for example) electrically and mechanically bonded by the rigid, electrically conductive joints 43—43, to the respective circuit elements 25 and 27. By such bonding, the rigid joints 43—43 secure the terminal portions 45 and 47 to the respective circuit elements 25 and 27 for movement therewith during expansion and contraction of the circuit board 33.

Comparing FIGS. 6*a* and 7, it may be noted that FIG. 6*a* shows the circuit board 33 having a thickness T that is less than the thickness T' of the circuit board 33 shown in FIG. 7 as a result of thermal expansion, for example, caused by a higher temperature of the circuit board 33 shown in FIG. 7, with respect to the temperature of the circuit board 33 shown in FIG. 6*a*. It may also be noted from FIGS. 6*a* and 7 that the rigid joints 43—43 and the terminal portions 45 and 47 have moved with the respective circuit elements 25 and 27 on the respective spaced surfaces 29 and 31 during the thermal expansion, for example, of the circuit board 33. As shown in FIG. 7, the terminal portions 45 and 47 of the braided conductor 219, in moving with the rigid joints, have caused the intermediate portions 39 of the braided conductor 219 to extend in the direction of the axis 49 of the aperture 23. Additionally, expansion of the circuit board 33 has caused the resilient core 217 to extend and deform into the condition shown in FIG. 7 wherein the outer periphery 89 of the intermediate section has moved away from the wall 38 of the aperture 23. (The amount of such extension of the intermediate portion 39, and the amount of the distortion of the intermediate section 35 of the resilient core 217 are shown out of proportion to the remainder of the disclosure of FIG. 7 for purposes of illustration.) The intermediate portion 39 was originally flexible and extensible, and remained extensible and flexible as a result of the sealing effect of the resilient core 217, the braided strands 109—109 and the wall 37. Additionally, with the individual strands 109—109 of the intermediate portion 39 gold plated, for example, and, hence, resistant to melting and being mutually fused together during the bonding operation, the strands 109—109 of the intermediate portion 39 were free to move relative to each other at the points at which the strands cross each other. It may be understood, then, that the intermediate portion 39 did not exert significant stress on the terminal portions 45 and 47 or on the rigid joints 43—43 when the circuit board 33 expanded.

Similarly, the intermediate portion 39 of the braided conductor 219 is easily compressed in the direction of the longitudinal axis 49 when the circuit board 33 contracts and, hence, the intermediate portion 39 does not apply significant stress on the terminal portions or on the rigid joints 43—43.

Attention is now directed to FIGS. 4 and 5, where an electrical circuit assembly 115 of the present invention is shown under two different environmental conditions similar to those referred to in the description of FIGS. 6*a*, 6*b* and 7. The flexible electrical conductor 119 is wound onto the resilient core 117 in the form of a helix which has the initial pitch P. The resilient core 117 with the electrical conductor 119 thereon is inserted into the aperture 23 so that the intermediate section 35 of the resilient core 117 is received in the aperture 23 and urges the intermediate portion 39 of the conductor 119 into engagement with the wall 37 of the aperture. The intermediate section 35 cooperates with the intermediate portion 39 and the wall 37 to seal the aperture 23 against passage of the solder 41 therein during the formation of the rigid, electrically conductive joints 43—43.

In FIG. 5, the circuit board 33 is shown expanded in the direction of the longitudinal axis 49 of the aperture 23 so that the spaced surfaces 29 and 31 of the circuit board are spaced by the greater distance T' than the thickness T shown in FIG. 4. The rigid solder joints 43—43 and the terminal portions 45 and 47 of the electrical conductor 119 are shown moved apart by the respective circuit elements 29 and 31. Upon such movement, the terminal portions 45 and 47 cause the intermediate portion 39 to flex and extend, causing the intial pitch P thereof to increase to P'. Because the molten solder 41 has been precluded from contacting the intermediate portion 39 during formation of the rigid joints 43—43, the intermediate portion readily flexes and extends so that no significant stress is applied by the intermediate portion 39 to the terminal portions 45 and 47 or to the rigid joints 43—43.

Attention is now directed to FIG. 9 where an alternative embodiment 315 of the electrical circuit assembly is shown including a circuit board 33 provided with an aperture 23 and circuit elements 25 and 27 on respective spaced surfaces 29 and 31. In this embodiment, a nonconductive sleeve 321 fabricated from easily deformable material, such as silicone rubber, is provided with a normal, outside diameter which may slightly exceed the diameter of the aperture 23 when the aperture is cylindrical, for example. With such such outside diameter of the sleeve 321, a press fit is obtained to facilitate retention of the sleeve in the aperture when the sleeve is inserted therein. The inner diameter of the sleeve 321 is selected to provide an aperture 323, similar to the aperture 23, so that the sleeve is receptive to the resilient silicone-rubber core 217 and the flexible, braided electrical conductor 219 similar to that illustrated in FIG. 3. The terminal portions 45 and 47 of the braided conductor 219 are electrically and mechanically connected to the respective circuit elements 25 and 27 by the rigid, electrically conductive joints 43—43 which are formed by the bonding material 41.

As shown in FIG. 9, the resilient core 217 urges the strands 109—109 of the intermediate portion 39 of the braided conductor 219 into engagement with the inner wall 327 of the sleeve 321. Because of the deformable nature of the sleeve 321 and the resilience of the resilient core 217, both the inner wall 327 of the sleeve and the outer periphery of the resilient core 217 are deformed by the portions of the strands 109—109 forming the intermediate portion 39 of the conductor 219 to form indentations 329—329 and 331—331, respectively, containing the individual strands 109—109. Mutually opposed portions 333—333 and 335—335 of the respective inner wall 327 of the sleeve 321 and the outer periphery of the resilient core 217, which portions are between the indentations 329—329 and 331—331, extend radially inward between the individual strands 109—109 and contact each other to form interfaces 337—337 or areas of contact which prevent passage of solder 41 into contact with the strands 109—109 forming the intermediate portion 39 of the braided conductor 219. It may be understood that the intermediate portion 39 is thereby free to flex and elongate upon thermal cycling of the circuit assembly 315, and exerts no significant stress on the solder joints 43—43 formed between the respective terminal portions 45 and 47 of the flexible electrical conductor 219 and the circuit elements 25 and 27.

It should be understood that sleeves similar to the sleeve 321 could be provided with various combinations of cores or conductors similar to those described previously for making preassembled connections (not shown) for ready insertion into complementary-shaped apertures which are the same or slightly larger than the outer dimensions of the sleeve 321. The outer periphery of the sleeve 321 may be any desired shape and such sleeves need not be flexible but could be made of rigid plastic, ceramic or even metal.

Referring now to FIGS. 3, 6*a*, 6*b*, 10, 11, 12 and 13, methods of the present invention for establishing an electrical connection between the circuit elements to form the electrical circuit assemblies may include the steps of inserting electrical conductors having flexible, extensible, curved, intermediate portions and terminal portions on opposite ends of the intermediate portion into apertures in supports. For example, the electrical conductor 219, in braided form, may be inserted into the aperture 23 of the circuit board 33 with the curved, intermediate portion 39 of the conductor 219 received within the aperture and the terminal portions 45 and 47 extending out of opposite ends of the aperture 23. The aperture 23 is sealed by inserting the resilient member 217, such as the resilient core fabricated from silicone rubber, into the center of the braided conductor 219, positioned in the aperture 23. The intermediate section 35 of the resilient member 217 urges the intermediate portion 39 of the electrical conductor 219 into engagement with the wall 37 of the aperture 23, whereas the end sections 68—68 of the resilient member 217 extend out of opposite ends of the aperture 23 and urge the terminal portions 45 and 47 of the electrical conductor 219 into engagement with the respective circuit elements 25 and 27 to establish the electrical connection between the circuit elements.

Preferably, as shown in FIG. 3, a preferred method of the present invention may be effected by braiding the plurality of closely woven strands 109—109 of electrically conductive material over and under each other in oppositely running helices in the form of the tube 111 on the outer periphery 89 of the resilient core 217 to form the braided, electrical conductor 219 having the curved, intermediate portion 39 and the spaced, terminal portions 45 and 47.

As assembled, the braided, electrical conductor 219 and the resilient core 217 (FIG. 3) are inserted into the aperture 23 (as shown in FIG. 10) by deforming the resilient core 217 into the deformed condition thereof. To so deform the resilient core 217, successive sections of the resilient core and the braided conductor are forced into the aperture 23 through a frustoconically shaped die orifice, having a minimum cross-sectional diameter slightly smaller than the diameter of the aperture 23. The resilient core 217 is advanced into the aperture 23 to the position shown in FIG. 6, in which the intermediate section 35 of the resilient core 217 and the intermediate portion 39 of the electrical conductor 219 are received in the aperture 23, and the end sections 68—68 and the terminal portions 45 and 47, respectively, extend out of opposite ends of the aperture. As the resilient core 217 is advanced into the position shown in FIG. 6, the intermediate section 35 of resilient core 217 remains in the deformed condition in the aperture 23 and urges the intermediate portion 39 of the electrical conductor 219 against the wall 37 of the aperture. The intermediate portion 39 and the intermediate section 35 cooperate with the wall 37 of the aperture 23 to seal the aperture against the entry of the bonding material 41 upon formation of the rigid, electrically conductive joints 43—43 between the terminal portions 45 and 47 of the electrical conductor 219 and the respective circuit elements 25 and 27 (as shown in FIG. 6). Additionally, it may be understood that during the insertion process the end sections 68—68 of the core 217 are released from the deformed condition thereof and assume the normal condition thereof, the portions of the end sections adjacent to the deformed intermediate section 35, cooperate with the circuit elements 25 and 27 and the electrical conductor 219 to seal the ends of the aperture.

Referring to FIG. 11, it may be understood that when the resilient core 217 has been advanced into the aperture 23 to the position shown in FIG. 6, the terminal portions 45 and 47 of the electrical conductor 219 are flared away from the normal position thereof into the position shown in FIG. 11 at an acute angle $\alpha$ with respect to the circuit elements 25 and 27. Also, as shown in FIG. 12, the flared terminal portions 45 and 47 of the electrical conductor 219 are then urged into contact with the circuit elements 25 and 27 prior to forming the rigid joints 43—43 between the terminal portions 45 and 47 and the respective circuit elements 25 and 27.

The final steps of the method of the present invention may include electrically and mechanically connecting each of the terminal portions 45 and 47 of the electrical conductor 219 to the respective circuit elements 25 and 27. Prior to these steps, the circuit board 33, the resilient core 217 and the electrical conductor 219 are assembled as shown in FIG. 12, for example, with the terminal portions 45 and 47 contacting the respective circuit elements 25 and 27, and the intermediate portion 39 and the intermediate section 35 cooperating with the wall 37 of the aperture 23 to seal the aperture against passage therein of the bonding material 41.

In the embodiment 315 shown in FIG. 9, for example, the portions 333—333 of the inner wall of the sleeve 321 cooperate with the portions 335—335 of the resilient core 217 and the strands 109—109 of the intermediate portion to seal both the aperture 23 in the board 33 and the aperture 323 in the sleeve 321 to preclude passage of the molten solder 41 from one side of the board to the other and prevent the solder from contacting the intermediate portion 39 of the conductor 219. It should be understood that if there is no objection to the solder 41 flowing from one side of the board 33 to the other, the sleeve may be a loose fit so long as the core 217 prevents solder from entering the aperture 323.

Referring now to FIG. 12, when the aperture 23 is sealed in the manner described and the terminal portions 45 and 47 of the electrical conductor 219 are exposed, the circuit board 33 is subjected to a bonding operation, such as the wave-soldering operation performed by apparatus of the type disclosed in Patent 3,041,991, which issued to H. A. Dvorak on July 3, 1962, to form the rigid joints 43—43 (FIG. 13) between the respective circuit elements 25 and 27 and the adjacent terminal portions 45 and 47 of the electrical conductor 219. During the bonding operation, the seal formed in the aperture 23 by the resilient core 217, the electrical conductor 219, and the wall 37 of the aperture 23, for example, precludes entry of the molten solder 41 into the aperture. With the molten solder 41 excluded from the aperture 23, no molten solder is permitted to flow around the curved intermediate portion 39 of the flexible electrical conductor 219 and, hence, no solder can harden therearound. Because none of the solder 41 hardens around the curved, intermediate portion 39, it may be appreciated that the curved, intermediate portion 39 thus remains flexible, extensible and conditioned for flexure, extension and contraction during cycling of the environment of the circuit assembly 215, so that no significant stress is applied by the curved, intermediate portion 39 to the rigid joints 43—43 (FIG. 13) or to the terminal portions 45 and 47, whereby the electrical circuit assembly 215 has an extremely low "FIT" rate.

It should be understood that even though the specific example of the preferred method of assembling circuit assemblies was described with respect to assembly 215, it is obvious that the other embodiments of the circuit assemblies could be assembled in a similar manner.

Accelerated life testing of eighteen circuit boards 33, each having seventy-eight electrical circuit assemblies thereon, was performed in cycles by rapidly varying the temperature of the assemblies from −50° F. to +160° F. and back to −50° F., for 100 cycles. This testing produced no failures or open conditions in any of the solder joints 43—43 of the 1404 electrical circuit assemblies tested. Moreover, the tests revealed no measurable change in the the over-all resistance of a circuit path formed on each circuit board 33 by interconnecting, in series, the seventy-eight electrical circuit assemblies thereon, where a change of 1 milliohm from a nominal of 125 milliohms would have been detected. Such results indicate that the electrical circuit assemblies will permit extremely low "FIT" rates to be achieved in systems using the assemblies.

In the various embodiments of the circuit assemblies, the terminal portions 45 and 47 of the various embodiments of the flexible, electrical conductor and the end sections 68—68 of the various embodiments of the resilient core have been described as preferably extending out of opposite ends of the aperture 23. It is to be understood, however, that the flexible, electrical conductor and/or the resilient core may terminate within the aperture 23, if desired, provided the resilient core precludes the passage of solder into contact with the intermediate portion of the flexible, electrical conductor and the intermediate portion is sufficiently flexible, as described above.

It is apparent that a composite resilient core and flexible conductor structure, particularly the types illustrated in FIGS. 2 and 3, may be fabricated in indefinite lengths and then be cut to any desired length before, during or after the insertion step.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. An electrical circuit assembly, which comprises:
an insulating support having a pair of spaced surfaces, said support having an aperture extending between and intersecting the pair of spaced surfaces;
circuit elements positioned on the support adjacent to opposite ends of the aperture;
at least one flexible, electrically conductive strand extending through the aperture and into electrical contact with the circuit elements, said strand being greater in length than the spacing between the circuit elements and providing a readily extensible and contractible, electrically conductive path between the circuit elements; and
resilient means received within the aperture in a compression deformed condition urging said strand into engagement with the wall of the aperture.

2. An electrical circuit assembly according to claim 1 wherein the resilient means maintains the opposite ends of said strand in said electrical contact with the circuit elements.

3. An electrical circuit assembly according to claim 1 which further comprises:
solidified bonding means fixedly attaching each end of the conductive path to one of the circuit elements; and
said resilient means urging said strand into engagement with the wall of the aperture, sealing the aperture against entry therein of said bonding means in a fluid state thereof to maintain the electrically conductive path readily extensible and contractible.

4. An electrical circuit assembly, which comprises:
insulating support means having a pair of spaced surfaces and an aperture extending between and intersecting the pair of spaced surfaces, said support characterized by relative movement of the spaced surfaces in response to temperature variations encountered during the normal use of the circuit assembly;
circuit elements secured to the support means adjacent to each end of the aperture, said circuit elements being moved relative to each other upon said relative movement of said spaced surfaces;
electrically conductive means having an intermediate portion extending through the aperture, the intermediate portion being extensible and contractible, the electrically conductive means having end portions extending from opposite ends of the intermediate portion and protruding out of the aperture beyond the pair of spaced surfaces;
solidified bonding means electrically and mechanically connecting each of said end portions to a respective one of the circuit elements; and
resilient means received in the aperture forming with the electrically conductive means a restricted passageway in the aperture, and preventing the bonding means in a fluid condition from contacting the intermediate portion so that the intermediate portion remains extensible and contractible, said intermediate portion being readily extensible and contractible upon said relative movement of the circuit elements, and precluding detrimental stressing of the connection between the end portions and the circuit elements.

5. An electrical circuit assembly according to claim 4 wherein the resilient means includes a readily deformable sleeve lining the wall of the aperture and a resilient core urging the intermediate portion of the electrically conductive means against the sleeve, said sleeve and resilient core cooperating with the intermediate portion for forming a restricted passageway, precluding passage of the bonding means in the fluid condition thereof in the aperture so that the intermediate portion remains extensible and contractible when the bonding means is solidified.

6. An electrical circuit assembly, which comprises:
insulating support means having a pair of spaced surfaces, said support means having an aperture extending between and intersecting the pair of spaced surfaces;
circuit elements provided on the support means adjacent to each end of the aperture;
a metal strand having a flexible, bent, readily extensible and contractible portion extending through the aperture and spaced portions extending from each end of the bent portion of the aperture into positions adjacent to the circuit elements;
solidified bonding means forming a rigid electrical and mechanical connection between each adjacent, spaced portion and circuit element; and
means formed of resilient material and received in the aperture in contact with the wall of the aperture and with the bent portion of the metal strand in a compression deformed condition, preventing passage of the bonding means in a fluid condition thereof in the aperture, and precluding contact between the bonding means and the bent portion so that said bent portion is maintained flexible.

7. An electrical circuit assembly according to claim 6 wherein the means formed from resilient material comprises a sleeve having a bore extending therethrough and a core received in the bore, the inner wall of the sleeve and the outer periphery of the core cooperating to extend around opposite sides of the bent portion of the metal strand into mutual engagement, precluding contact between the bonding means in a fluid condition thereof and the bent portion of the metal strand between the sleeve and the core.

8. An electrical circuit assembly, which comprises:
insulating means having spaced surfaces, an aperture extending between and intersecting the spaced surfaces, the insulating means having a characteristic of expanding and contracting as a result of temperature variations attendant the normal use of the electrical circuit assembly;
electrically conductive circuit elements secured to the insulating means adjacent to each end of the aperture;
an electrical conductor having an intermediate, braided, sleeve-like portion received in the aperture and having spaced, terminal portions extending from each end thereof adjacent to one of the circuit elements, said braided portion being extensible and contractible;
solidified bonding means across each adjacent terminal portion and circuit element forming rigid joints electrically connecting each adjacent terminal portion and circuit element; and resilient means received within the aperture for blocking the aperture to preclude said bonding means in a fluid condition thereof from contacting the intermediate, braided portion so that the intermediate, braided portion is free to extend and contract upon said expansion and contraction of the insulating means whereby the electrical conductor exerts a minimum of stress on the rigid joints.

9. An electrical circuit assembly according to claim 8 wherein the resilient means comprises a resilient core received in the aperture for urging the braided portion toward the wall of the aperture, and an easily deformable sleeve interposed between the braided portion and the wall contacting the braided portion and the resilient core, sealing the aperture and precluding the bonding means in a fluid condition thereof from contacting the braided portion so that the braided portion is free to extend and contract upon said expansion and contraction of the insulating means.

10. An electrical circuit assembly, which comprises:

insulating means having a pair of spaced surfaces and an aperture extending between and intersecting the spaced surfaces, said aperture having a cross section provided with a given minimum dimension, said insulating means characterized by expansion and contraction in response to thermal variations encountered during the normal use of the electrical circuit assembly;

electrically conductive circuit elements mounted on the pair of spaced surfaces of the insulating means adjacent to each end of the aperture;

a resilient core having a diameter less than said given minimum dimension, said core being received in the aperture;

flexible, electrically conductive means wound on the outer periphery of said resilient core deforming portions of said outer periphery of said core between said conductive means radially outward toward the portion of the wall of said aperture having the given minimum dimension to seal the aperture; and solidified bonding means having a fluid condition and normally being in a solid condition, forming a rigid electrical connection between the respective circuit elements and the flexible, electrically conductive means, said bonding means being precluded by the seal formed by the deformed portions and the wall from flowing into the aperture in the fluid condition thereof so that the electrically conductive means remains flexible.

11. An electrical circuit assembly, which comprises:

insulating means having a pair of spaced surfaces and aperture extending between the spaced surfaces, said aperture having a cross section provided with a given minimum dimension, said insulating means characterized by expansion and contraction in response to thermal variations encountered during the normal use of the electrical circuit assembly;

electrically conductive circuit elements mounted on the pair of spaced surfaces of the insulating means adjacent to each end of the aperture;

a braided, electrical conductor having a first portion received in the aperture and terminal portions extending from each end of the first portion adjacent to one of the circuit elements, said first portion of the braided conductor having a configuration substantially conforming to that of the aperture and having a cross section provided with at least said given minimum dimension;

solidified bonding means, having a fluid condition and a normal solid condition, across each adjacent circuit element and terminal portion, and forming a rigid connection between each adjacent terminal portion and circuit element; and a core having at least one section having a cross section provided with a normal dimension exceeding the given minimum dimension, the core being fabricated from a material capable of being deformed into a deformed condition wherein the cross section of said one section is reduced to substantially said given minimum dimension, said core being received in said aperture and deformed by the wall thereof into said deformed condition urging the first portion of the conductor into engagement with the wall, the core in cooperation with the first portion and the wall precluding the bonding means in said fluid condition from contacting the first portion and preventing flexture of the first portion when the bonding means is in the solid condition so that a minimum of stress is exerted by the conductor on the rigid connections during said expansion and contraction of the insulating means.

12. An electrical circuit assembly which comprises:

a circuit board having a pair of spaced surfaces and an aperture extending between and intersecting the spaced surfaces, said circuit board having circuit elements thereon adjacent to each end of the aperture, said circuit board characterized by relative movement between the circuit elements in response to changes of the environment of the circuit assembly;

an electrical conductor formed from braided, electrically conductive strands, said electrical conductor having opposite ends spaced by an intermediate portion, said intermediate portion being flexible to permit relative movement in a first direction between the opposite ends, said intermediate portion being received in the aperture with its opposite ends extending out of the aperture;

solder joints maintaining each opposite end of the conductor in rigid electrical and mechanical contact with one of the circuit elements for movement therewith in the first direction during said environmental changes of the circuit assembly, said movement of each opposite end of the conductor being effective to flex the intermediate portion of the conductor, the solder of said solder joints having a tendency in a fluid condition thereof to enter said aperture and contact the intermediate portion of the conductor; and a resilient member received in the aperture for urging the intermediate portion of the conductor against the wall of the aperture, sealing the aperture, and precluding the solder of said solder joints in the fluid condition thereof from entering the aperture so that the intermediate portion of the conductor is in condition to flex upon said relative movement of the circuit elements.

13. An electrical circuit assembly according to claim 1 wherein said strands extend in a helical path around the periphery of at least the intermediate section of the resilient means.

14. An electrical circuit assembly, which comprises:

insulating support means having a pair of spaced surfaces and an aperture extending between and intersecting the pair of spaced surfaces, the aperture having a wall provided with a given configuration, the support means characterized by relative movement of the pair of spaced surfaces in response to temperature variations encountered during the normal use of the electrical circuit assembly;

circuit elements secured to the support means adjacent to each end of the aperture, the circuit elements being moved relative to each other in the direction of said aperture upon said relative movement of said pair of spaced surfaces;

a braided, electrical conductor received in the aperture, the conductor having an intermediate portion, the intermediate portion being provided with a hollow configuration and an outer periphery conforming to the given configuration, the conductor having terminal portions spaced by said intermediate portion and extending out of the aperture onto the circuit elements for movement therewith during said relative movement of the circuit elements;

solder means for electrically and mechanically connecting the terminal portions of the conductor to the circuit elements, the solder means having a tendency in a fluid condition thereof to pass into the aperture; and a resilient core capable of being compressed into said given configuration, the resilient core being received within the hollow intermediate portion of the conductor in the aperture, the resilient core being compressed by the wall of said aperture into the given configuration, urging the intermediate portion of the conductor against the wall of the aperture, and cooperating with the intermediate portion to seal the aperture against passage of the solder means so that the intermediate portion remains flexible upon connection of the terminal portions to the circuit elements.

15. An electrical circuit assembly, which comprises:

a circuit board provided with a pair of spaced surfaces and an aperture extending along a given axis between and intersecting said pair of surfaces, said circuit board having circuit elements adjacent to the ends of said aperture, said circuit board being subject to changes in a dimension thereof extending in the direction of the given axis upon variations in the temperature thereof, said pair of spaced surfaces and the circuit elements thereon being moved in the direction of the given axis upon said changes in the dimension of the circuit board;

an electrical conductor fabricated in the form of a helix having an initial pitch along the axis of the helix, said conductor having an intermediate portion received in the aperture with the axis of the helix generally parallel to the given axis, said conductor having terminal portions extending from the ends of the intermediate portion out of the aperture, at least a portion of the helix being surrounded by the wall of the aperture;

bonding means establishing a rigid mechanical and electrical joint between the terminal portions of the conductor and the circuit elements and causing the terminal portions to move relative to each other upon said changes in the dimension of the circuit board, said relative movement of the terminal portions causing variations of the initial pitch of the portion of the helix;

a sleeve received in the aperture between the wall and the portion of the helix; and a resilient core received in the aperture within at least the intermediate portion of the helix cooperating with the sleeve to preclude the bonding means from contacting the intermediate portion of the helix.

16. An electrical circuit assembly, which comprises:

an insulating panel having a pair of spaced surfaces, said panel having an aperture extending between and intersecting the spaced surfaces of the panel;

electrically conductive circuit elements positioned on the panel adjacent to opposite ends of the aperture;

an electrically conductive connector received within the aperture, said connector comprising a plurality of metal strands braided over and under each other in oppositely running helices to form a hollow, braided sleeve, said braided sleeve being readily extensible and contractible, the metal strands at the opposite ends of the braided sleeve extending from the aperture and being positioned adjacent to the respective circuit elements;

solidified bonding means forming rigid joints mechanically and electrically connecting the metal strands at the opposite ends of the braided sleeve to the respective circuit elements; and a resilient member formed at least in part of a compliant, rubber-like material and positioned within the braided sleeve and the aperture resiliently urging the braided sleeve radially outwardly toward the wall of the aperture and cooperating therewith, sealing the aperture and precluding the bonding means when in a fluid state from entering the aperture and preventing it from wetting the portion of the braided sleeve received within the aperture so that the last-mentioned portion is left free to extend and contract upon thermal expansion and contraction of the panel in a direction generally along the longitudinal axis of the aperture, whereby the connector imposes a minimum of stress on the rigid joints.

17. An electrical circuit assembly according to claim 16, wherein the rubber-like material is silicone rubber.

18. An electrical circuit assembly according to claim 17, wherein the metal strands are gold-plated copper wires and the fusible bonding means is a metal alloy solder.

References Cited by the Examiner

UNITED STATES PATENTS

| | | | |
|---|---|---|---|
| 3,024,437 | 3/1962 | Van Deusen. | |
| 3,105,729 | 10/1963 | Rosenthal et al. | |
| 3,148,356 | 9/1964 | Hedden ---------- | 174—68.5 X |

LEWIS H. MYERS, *Primary Examiner.*

DARRELL L. CLAY, *Examiner.*